United States Patent [19]

Leva

[11] 4,310,475
[45] Jan. 12, 1982

[54] TOWER PACKING ASSEMBLY

[76] Inventor: Max Leva, 5600 Munhall Rd., Pittsburgh, Pa. 15217

[21] Appl. No.: 155,617

[22] Filed: Jun. 2, 1980

[51] Int. Cl.³ .............................................. B01F 3/04
[52] U.S. Cl. ................................. 261/113; 202/158; 261/94; 261/DIG. 72; 422/311
[58] Field of Search ................. 261/94, 113, DIG. 72, 261/DIG. 41; 202/158; 422/311

[56] References Cited

U.S. PATENT DOCUMENTS

| 805,305 | 11/1905 | Lieber | 261/DIG. 72 |
|---|---|---|---|
| 1,521,872 | 1/1925 | Dellinger | 261/94 X |
| 2,186,152 | 1/1940 | Seitz | 261/94 |
| 2,470,652 | 5/1949 | Scofield | 261/94 |
| 2,615,699 | 10/1952 | Dixon | 261/94 X |
| 2,875,992 | 3/1959 | Pirsh et al. | 261/DIG. 72 |
| 3,075,752 | 1/1963 | Leva | 261/113 |
| 3,446,489 | 5/1969 | Leva | 26/113 X |
| 3,928,513 | 12/1975 | Leva | 261/113 |
| 3,933,953 | 1/1976 | Leva | 261/113 X |

Primary Examiner—Richard L. Chiesa
Attorney, Agent, or Firm—William J. Ruano

[57] ABSTRACT

A liquid-gas contacting apparatus for distillation, gas absorption and related mass transfer operations. The apparatus comprises a series of vertically spaced, horizontal sheets having openings which are laterally offset from each other. The space between the sheets is partly or entirely filled with mesh packing material, such as knitted wire mesh, steel wool, hair-like metallic or fibrous packing material, such as fiberglass and the like. Such packing material may be in the form of undulating mats. Various shapes of chimneys may surround the openings and extend either upwardly, downwardly or both. In some instances the chimneys themselves may be of such packing material and may be filled with mats of such packing material. Greatly enhanced mass transfer efficiency is obtained.

5 Claims, 9 Drawing Figures

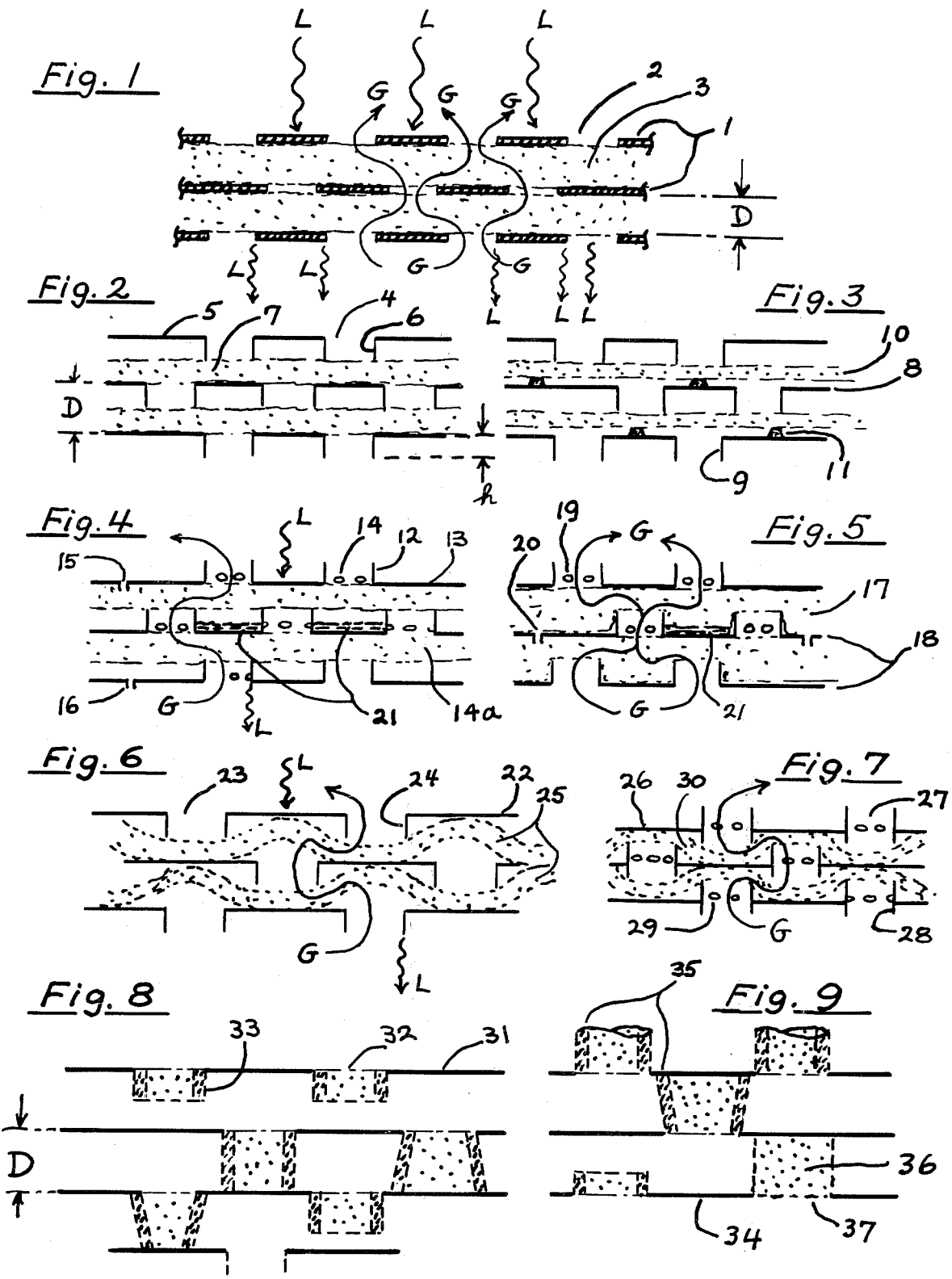

TOWER PACKING ASSEMBLY

This invention relates to a novel arrangement of mesh tower packing material, such as knitted or woven mesh, in towers which are used in distillation, gas absorption and related air-or vapor-liquid mass transfer operations.

It is well known that knitted mesh packings are extensively used in such towers. The materials of which these knitted mesh packings are manufactured may be of a broad variety. Principally, however, they are made of metals, such as carbon steels, stainless steels, copper and any other metals that are capable of being drawn out into fine wires that serve as the basic element of the knitted mesh packings. The knitted mesh packings are, of course, also manufactured from a variety of plastics. The present invention will apply to all these materials of construction, and even those which are not specifically mentioned but which are capable of being used in knitted mesh manufacture, such as, for example, glass fiber or other fiber made of other inorganic materials. There are some significant inherent advantages associated with the use of knitted mesh packings. The most important advantage is probably that knitted mesh packings offer very large contact surface areas that may be useful to bring about gas-liquid contact. Another advantage offered by the knitted mesh packings is the fact that they are pre-manufactured and are readily supplied in the form of cartridges, ready for use in the towers. Thus, the performance characteristics of these packings are readily predictable, and, in fact, much more so than the performance characteristics of randomly dumped packings, where deviations in characteristics will occur, depending on the manner in which the randomly dumped packings were charged into the towers.

There are, however, some severe disadvantages which are associated with the present use of knitted mesh packings. Thus one of the disadvantages is that knitted mesh packings may only be used with absolutely clean gas-liquid systems. Another disadvantage is that elaborate and generally expensive liquid distributors are required in combination with knitted wire mesh packings. A third and very serious disadvantage which knitted mesh packings have when used in deep layers is they apparently do not have the capability of maintaining an initially good liquid distribution. Thus, in beds of knitted mesh packings of only relatively shallow beds, there will set in a distinct deterioration of contacting efficiency in the lower portions, resulting in undesirable overall decreases in gas-liquid contact efficiencies. These efficiency decreases become particularly noticeable as the diameter of the contacting tower, and hence the knitted wire mesh cartridge, increases. Thus, one finds that the ordinary knitted mesh wire packings cannot be used competitively in towers that are of diameters substantially in excess of one to two feet.

Having been familiar with these severe drawbacks associated with the present use of knitted wire mesh packings, it has been surprisingly and unexpectedly discovered that these disadvantages may be dispensed with by using the knitted wire mesh packings in accord with the arrangement described below. Broadly stated, the invention employs knitted wire mesh packings and other packings of various contructions and weaves in relatively thin layers, which layers are placed normally between thin gage horizontal perforated flat metal sheets. The openings in these sheets may be of any shape, such as circular, oblong, elliptical, square, triangular, etc. While the shape of the openings is not primarily important, it is, however, of prime importance that the openings are located in the sheets in such a manner that they are laterally offset from neighboring sheets. The effective size of the openings may, of course, vary, and where circular and related openings are involved, their effective diameters may be as small as $\frac{1}{4}$ inch, whereas the largest effective openings may be as large as eight inches in effective diameter. However, for most applications it has been found that the size of the openings will be between one half and four inches.

Since the openings in the sheets will accomodate gas or vapor flow, generally upwardly, and liquid flow downwardly, and since the openings are directly adjacent to the relatively thin layer of knitted wire mesh packings and communicate the liquid to the packings, it is important that the combined surfaces of all the openings in the sheets free area comprise an area that is in excess of 15 percent of the area of the sheets. For best working results, the percent free area in these sheets should be between 25 and 50 percent.

The spacing between die sheets is also important. Thus it has been found that for selected applications the spacing may have to be a small as $\frac{1}{4}$ inch, whereas for others, the spacing between the sheets may be as large as one foot. For most cases, however, the spacing between the sheets will be of the order of one-half to six inches.

As will be seen from the illustrations, there will be instances in which the knitted mesh will occupy the entire space between the flat sheets. There will, however, also be cases where the knitted mesh will be of less thickness than the spacing between the sheets. Furthermore, there will be instances where the knitted mesh will proceed in an undulating manner between the sheets. Finally, there will be cases where the knitted mesh will be employed in the form of discrete shapes and designs, arranged between the sheets as well.

The openings which are provided in the sheets may simply be plain openings or they may be openings with the rims being bent downwardly or upwardly. Finally, it is within the spirit of the invention to have chimneys attached to the openings pointing away from the sheets either upwardly or downwardly, or simultaneously in both directions. The knitted mesh packings will, in these instances, be placed in wave-like, undulating manner between the sheets, being deflected upwardly and-/or downwardly by such chimneys.

As has already been stated, the openings in the sheets will accomodate simultaneous downward flow of liquid and normally upward flow of vapor or gas. The liquid is thus fed by the holes or the chimneys onto the knitted mesh, where due to capillary forces, the strands of the knitted mesh become wetted. The gas or vapor proceeding upwardly and through the interstices between wetted strands in the knitted mesh will cause mass transfer to occur between the liquid and gas or vapor. Once this process of mass transfer has thus occurred for any one particular knitted mesh layer contained in a particular cell between the sheets, the liquid drips off the knitted mesh into the next lower sheet, where through the function of the openings in the next lower sheet the liquid is fed onto the knitted mesh in this lower cell and the process of mass transfer repeats itself.

From this it will be seen that the device will provide a continuous process of feeding liquid onto knitted mesh, mass transfer occurring as a consequence of gas or vapor flow, collection of the liquid from the knitted mesh onto the sheets and repetition of the process as one descends downwardly in the tower structure. It is furthermore apparent that by this repeated process of liquid distribution, collection and redistribution, and simultaneous contacting by the vapor or gas, a very efficient method of wetting of knitted mesh has been achieved, which is entirely independent of the diameter of the contacting tower. Furthermore, due to the constant and instant liquid mixing on the sheets, prior to flow of the liquid to the next lower sheet, an optimum mass transfer driving force between the liquid and vapor or gas has been created. Since the efficiency of any mass transfer device is highly dependent on the quality of liquid mixing and establishment of an optimum driving force for mass transfer to occur, it is apparent that through the arrangement described, the working efficiency of knitted mesh packing has been greatly upgraded.

Having now described the invention generally, specific modifications will be described in the accompanying description and drawings wherein:

FIG. 1 is an elevational view in cross-section which shows the broad features of the invention;

FIG. 2 is a modification of the arrangement;

FIG. 3 shows still another modification;

FIG. 4 shows a further modification of FIG. 2;

FIG. 5 shows a further modification of FIG. 1;

FIG. 6 shows a further modification wherein an important change has been made as far as the arrangement of the knitted mesh is conerned;

FIG. 7 shows a modification of the arrangement shown in FIG. 6;

FIG. 8 shows an entirely different arrangement of knitted mesh packing, but clearly within the scope of the invention; and FIG. 9 shows a further modification of the arrangement shown in FIG. 8, as well as another new feature.

Thus having described the illustrations, a detailed discussion of the individual Figures will follow.

FIG. 1 shows the invention in its broadest sense. The perforated thin sheets which may be of metal, plastic, glass, etc., are identified by numeral 1. The openings in the sheets are indicated by numeral 2. It will be noted that these openings are merely holes punched out of sheets 1, and carrying no downwardly or upwardly extending burrs. Generally, it is not desirable to have burrs on the edges of the holes since they will give an opportunity for deposits to collect and the burrs may create an interference with the orderly and ready spreading out of the knitted or woven mesh, which is shown by numeral 3. The distance between the sheets is indicated by "D". Whereas in various Figures this distance is the same all over, it is conceivable that for process reasons or otherwise, distance "D" may vary for different vertical positions. Generally it is convenient to arrange a sequence of series of sheets in vertical position, arrange the knitted mesh in between the sheets and bolt the entire structure together into a solid stack, very much like the construction that is shown in U.S. Pat. Nos. 3,075,752 and 3,928,513.

It will be noted that knitted mesh 3 fills the entire spacing between adjacent sheets, thus making contact with the top and bottom surfaces of the sheets.

Liquid is administered to the top of the sheet and as indicated by undulating arrows "L". The liquid is seen to leave the lowest sheet, principally from the rims of the openings, although it may occur that with high irrigation rates, liquid may also leave from the knitted mesh itself. However, this liquid flow will generally be of a minor amount, and most of the liquid will leave from the edges of the openings, and can thereby be accurately guided to similar stacks of the construction below, and will thus preclude use or employment of a special liquid redistributor between the individual stacks.

The gas is administered from below and is indicated by arrows G. It is seen to "weave" itself through the knitted mesh, which has been wetted by the liquid that comes from above, and at the points of juncture of liquid and gas, mass transfer is taking place. It will be seen that by judicious choice and design it is possible to optimize this contact and hence the occuring mass transfer.

FIG. 2 is a modification of the arrangement of FIG. 1, in that the openings 4, contained in sheet 5, are provided with short downwardly extending chimneys 6. The knitted wire mesh, represented by numeral 7, lies flat on the top side of the horizontal sheets, and its thickness is such that its upper boundary is substantially in contact with the lower edge of the downwardly extending chimneys 6. These chimneys may be of various shapes, such as cylindrical, flared in either direction or other selected shapes, without being outside the scope of the invention. The length or heights of the chimneys may also vary and may extend from as little as about ⅜ inch to as long as three inches. Generally, it may be convenient to define the height "h" of the chimneys in relation to the spacing "D" of the sheets. Thus it has been found that best results will be obtained when h/D ranges from substantially zero to about 0.80. The function of the chimneys is to provide additional liquid distribution stability across the sheets and into the knitted mesh. This becomes particularly important at low liquid irrigation rates as well as in operations where viscous fluids are involved, in which cases distribution of the liquids over the sheet and into the knitted or woven mesh would not be as satisfactory without employment of the downwardly extending chimneys.

In FIG. 3, the horizontal sheets are shown by numeral 8, with depending chimneys 9. The knitted mesh in sheet or mat form is represented by numeral 10 and is seen to be resting on spacers 11. Thus it may be seen that the knitted mesh is not in direct contact with the horizontal sheet 8, which will enhance the use of this construction in service where fouling tendencies are involved. By thus keeping the knitted mesh substantially away from the horizontal sheet, incrustations are greatly minimized and the device may be readily taken apart for cleaning.

FIG. 4 is similar to FIG. 3, except that the chimneys 12 extend upwardly from the horizontal sheet 13. The knitted mesh 14 lies on top of the upper edge of chimneys 12 and is in contact with the underside of sheets 13. Liquid enters from the top and leaves from the bottom as is indicated by undulating arrows L, and gas rises upwardly as shown by weaving arrow G. It will be noted that the chimneys 12 are provided in the walls thereof with drainholes 14 to allow the liquid to pass downwardly from the horizontal sheet. Whereas normally provision of such drainholes 14 in the chimneys 13 will suffice for normal irrigation rates, additional drain holes 15 may be required for higher irrigation rates. In order to direct the liquid which will thus issue through drain holes 15 downwardly and prevent lateral uncontrolled adhesive flow along the underside of the sheets, the drainholes 15 are provided with short nozzles 16.

FIG. 5 is a further modification of FIG. 4, in that the knitted mesh 17 occupies the entire spacing between horizontal sheets 18. Only the course of gas flow is indicated by weaving arrows G, and drainholes 19 for the liquid are provided in the walls of the chimneys, as well as drain holes 20 in the sheet itself. The constructions shown in FIGS. 4 and 5 are chiefly intended for use in systems where only relatively low to modest liquid flows are involved. Thus in both constructions, liquid pools 21 are formed, which are in effect reservoirs and will be helpful to provide positive feeding and a uniform liquid distribution that would otherwise in the absence of such pools be difficult to achieve.

FIG. 6 shows horizontal sheets denoted by numeral 22. Openings 23 are provided by downwardly extending chimneys 24. The knitted wire mesh shown by numeral 25 is arranged between the horizontal sheets in the form of an undulating pattern, with crests touching the underside of a sheet and valleys touching the top sides of the next sheet below. Liquid flows into and away from the device are indicated by undulating arrows L and gas flow is shown by weaving arrow G. It will be noted that with this arrangement the gas passing through the apparatus passes more nearly along the contours of the knitted mesh so that with this construction, the effective contact between liquid and gas is improved.

FIG. 7 shows a variation of the design of FIG. 6. The sheet material is identified by numeral 26 and it is seen that the openings 27 in the sheet material are provided with chimneys 28 which pass both downwardly and upwardly. As would be required, the upwardly extending portion of the chimneys are provided with drainholes 29. The knitted mesh packing 30 is seen to be exhibiting an undulating pattern. Gas flow is indicated by arrow G and it will be noted that by having provided upwardly extending portions to the chimneys 28, the gas passage through the apparatus is directed in a more positive manner than in FIG. 6 to pass along the contours of the knitted wire mesh. Hence it was found that by having provided these upward chimney extensions, the contacting efficiency of the device has been greatly improved.

FIG. 8 shows an entirely different arrangement. The sheet material is identified by numeral 31. The openings 32 in the sheet material are in offset position in adjacent sheets. The knitted wire mesh material on the other hand is in this design not supplied by a continuous layer between the sheets, as has been the practice with all the designs discussed so far, but the knitted wire mesh is now provided in the form of depending chimneys 33. In FIG. 8 these chimneys have been created by having manufactured short cylindrical bodies which have been fitted to the undersides of the sheets at the location of the holes. It will be noted that all cylindrical bodies in FIG. 8 are hollow on the inside. As will be seen, they may be of varying shapes, as discussed before, but whereas the impervious chimneys in the designs shown in FIGS. 2 to 7 will only extend up to 75 percent to the adjoining sheet, these knitted wire mesh chimneys may extend through the entire spacing D as is shown. This distinction from impervious chimneys is possible by virtue of the liquid and gas penetration which knitted wire mesh chimneys will allow. Thus it may be seen that with knitted wire mesh chimneys, all the liquid and gas passage has been narrowly limited to a relatively thin layer of knitted wire mesh, and it was found that with a construction of the type shown in FIG. 8, a gas-liquid contact apparatus of high intensity and greatly enhanced mass transfer will result. It will also be seen that with the knitted wire mesh chimneys extending through the entire distance D, the chimneys themselves may be employed as spacer elements for the horizontal sheets. In some instances, porous material such as wire mesh, preferably of greater permeability, may occupy the space inside chimneys 33 ad perhaps the space between the bottoms of the chimneys and top surface of the horizontal sheet below.

FIG. 9 shows a construction which is related to FIG. 8. The perforated sheet is denoted by numeral 34. Knitted wire mesh chimneys 35 are used which are of different shapes and are hollow inside. Also shown is a knitted wire mesh "chimney" 36 which is actually a full or solid cylindrical body made of knitted wire mesh and attached to opening 37 in the sheet. Although "chimney" 36 is not a chimney in the sense of all the other chimneys discussed so far, it is nevertheless a chimney functionally by permitting liquid and gas flow through its interior as a consequence of its permeability. All chimneys in FIG. 9 are pointing upwardly. Due to the permeability of the knitted wire mesh cylinder walls, no special drain holes are required with this construction.

While knitted and/or woven wire mesh has been described as a preferred form of porous material since they provide more uniform permeability over a given area, it should be noted that any other porous materials are also suitable, such as metallic wool, including steel or copper wool, non-metallic wool, for example, fiber glass, hair-like permeable mats of various materials, wire mesh cartridges, porous ceramic tile, etc.

While I have illustrated and described several embodiments of my invention, it will be understood that these are by way of illustration only and that various changes and modifications may be contemplated in my invention within the scope of the following claims.

I claim:

1. A liquid-gas contacting apparatus for distillation, gas absorption and related mass transfer operations, comprising a series of vertically spaced, horizontally extending sheets, each being provided with a plurality of openings which are laterally offset from openings of adjacent sheets, and a porous material extending in the space between said sheets, said openings being surrounded by downwardly extending chimneys and said porous material having only line contact on its top surface with said chimneys.

2. Apparatus as recited in claim 1 wherein said openings are surrounded by downwardly extending chimneys whose edges make only line contact with top surface portions of said porous material.

3. Apparatus as recited in claim 1 together with a plurality of spacer elements on the top surface of said sheets for providing only substantially point contact with the bottom surfaces of said porous material.

4. Apparatus as recited in claim 1 wherein said openings are surrounded by cylindrical chimneys which extend upwardly and downwardly from said sheets and make only line contact with the top and bottom surfaces of said porous material.

5. Apparatus as recited in claim 1 wherein drain holes are provided in the side walls of said chimneys.

* * * * *